Oct. 13, 1970  J. D. HELBIG  3,533,529

FLOATABLE BEVERAGE BOWL

Filed Oct. 18, 1968  2 Sheets-Sheet 1

INVENTOR.
Jim D. Helbig
BY
Bertha L. MacGregor
ATTORNEY

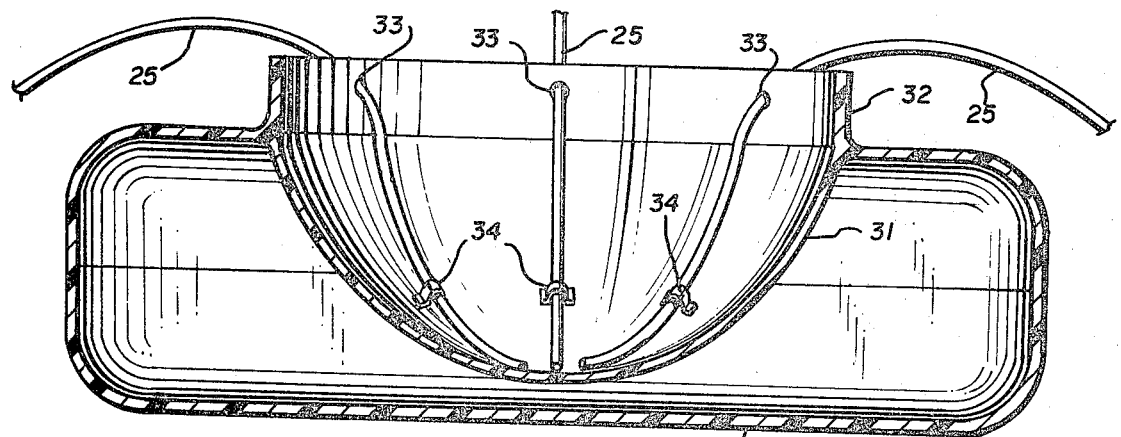
FIG. 4
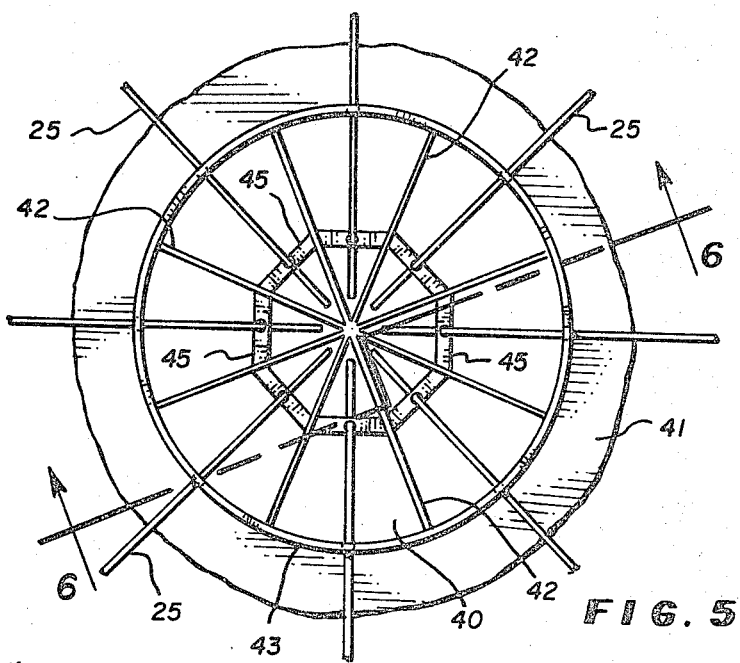
FIG. 5
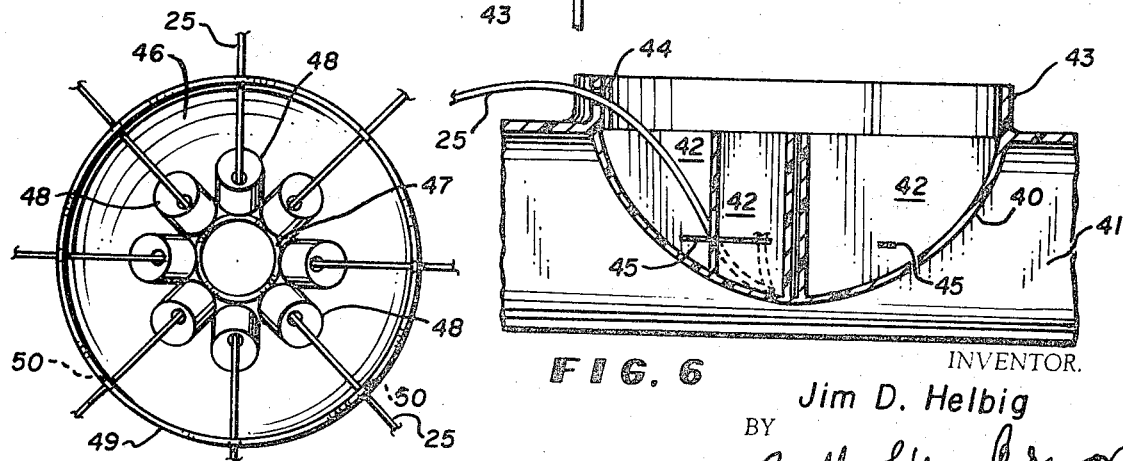
FIG. 6
FIG. 7
INVENTOR.
Jim D. Helbig
BY
Bertha L. MacGregor
ATTORNEY

United States Patent Office 3,533,529
Patented Oct. 13, 1970

3,533,529
FLOATABLE BEVERAGE BOWL
Jim D. Helbig, 50 S. 17th Ave. Drive,
Brighton, Colo. 80601
Filed Oct. 18, 1968, Ser. No. 768,752
Int. Cl. B65d
U.S. Cl. 220—1      7 Claims

ABSTRACT OF THE DISCLOSURE

A floatable beverage bowl comprising a bowl provided with a plurality of sippers and an inflatable or floatable base for supporting the bowl, whereby a number of persons may simultaneously sip the beverage in the bowl while in a swimming pool or other body of water. The bowl includes means for detachably holding sippers in predetermined positions. The bowl and base may be integrally formed or may be separate units. When separate units, the bowl is self-adjusting relatively to the base, and is retained in intended position due to distribution of weight resulting from the location of the beverage containing portion of the bowl below the upper surface of the base.

---

This invention relates to a floatable beverage bowl comprising a bowl provided with a plurality of sippers and an inflatable or floatable base for supporting the bowl, whereby a number of persons may simultaneously sip the beverage in the bowl while in a swimming pool or other body of water. The bowl and base may be integrally formed of plastic or other suitable material, or they may be separate units in which the bowl is removably supported on the base.

One of the objects of the invention is to provide a bowl constructed to rest on a floatable base and to be removably retained thereon.

Another object is to provide means in the beverage bowl for detachably holding the sippers in the bowl in predetermined spaced apart positions, said holding means permitting removal of the sippers, without removal of the holding means, and said holding means also being removable from the bowl for cleansing purposes.

Another object of the invention is to provide means in the bowl for dividing the interior into separate compartments for holding different beverages, or to provide retaining means which support beverage containers such as cans or bottles within the bowl.

In the drawing:

FIG. 4 is a vertical transverse sectional view of a modified form of the invention in which the base and bowl are integrally formed.

FIG. 5 is a top view of a modification in which the bowl is divided into compartments.

FIG. 6 is a vertical sectional view in the plane of the line 6—6 of FIG. 5.

FIG. 7 is a top view of another modification of the bowl construction.

Figure 1:
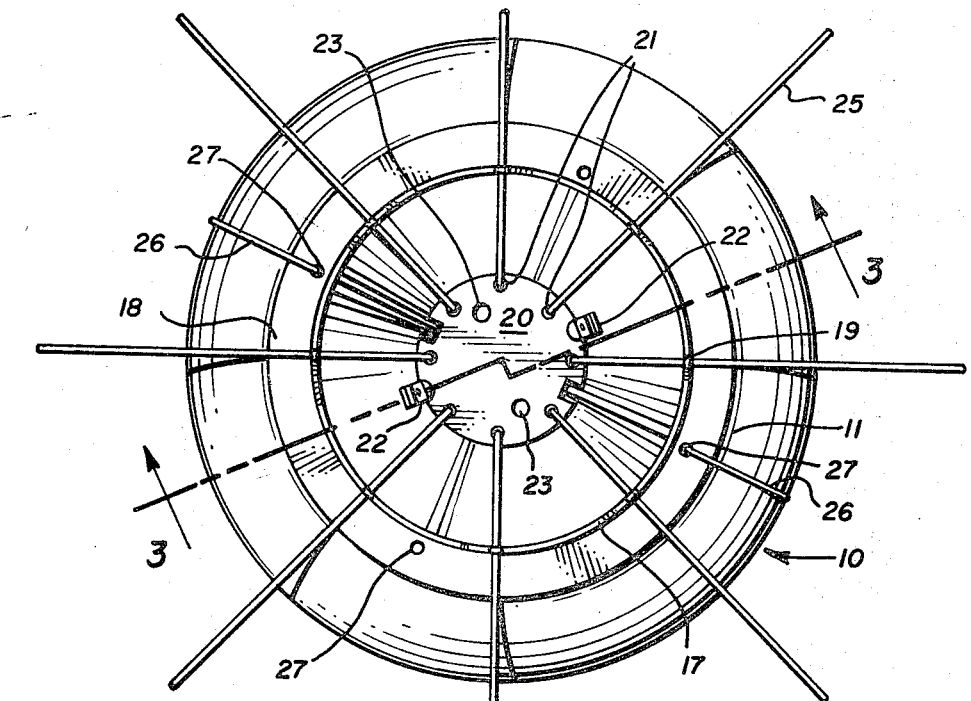
FIG. 1 is a top plan view of the floatable beverage bowl embodying my invention.
Figure 2:
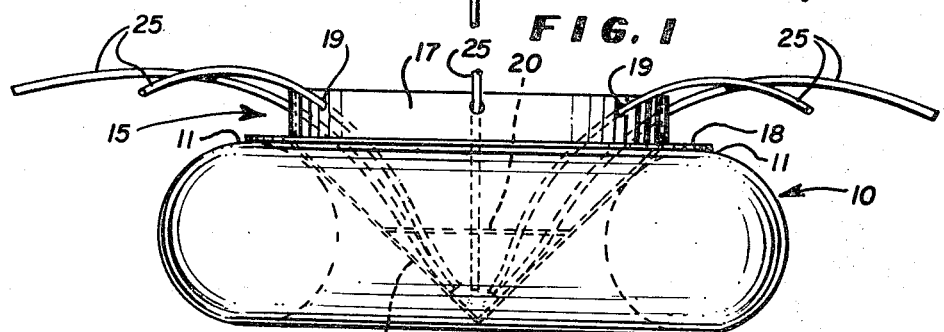
FIG. 2 is a side elevational view of the same.
Figure 3:
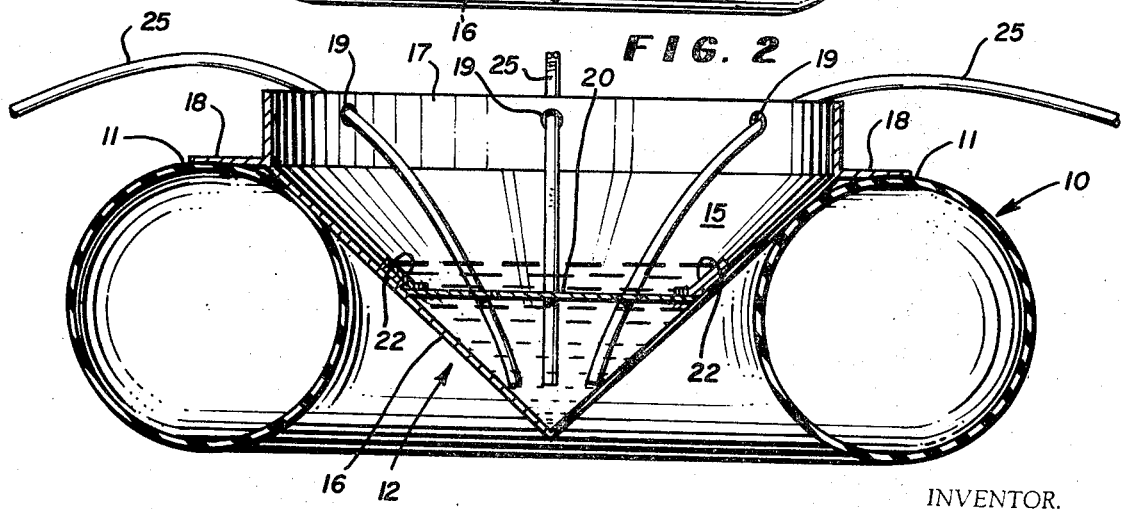
FIG. 3 is a vertical sectional view in the plane of the line 3—3 of FIG. 1.

In the embodiment of the invention shown in FIGS. 1–3 of the drawing, an inflatable or floatable base 10, made of any suitable material, has an upper bowl supporting surface 11 and a central recess or opening 12. The base has depth between its upper and lower surfaces defining the side surfaces of the recess or opening 12. A beverage bowl 15 comprises a generally conical lower body 16, upper collar 17 and horizontally disposed outwardly directed flange 18. The collar 17 has apertures 19 extending therethrough. In this embodiment, eight apertures 19 have been shown, circumferentially spaced apart on the collar 17, but any preferred number may be used to receive the sippers 25 referred to hereinafter.

A sipper retaining plate 20 is located in the bowl body 16 above the bottom, with its circumferential edge bearing on the conical wall of the bowl body. The plate 20 is provided with holes 21 equal in number to the apertures 19 in the collar 17. The plate 20 is retained in fixed position in the bowl by holddown brackets 22 fastened to the bowl body 16 and adapted to overlie the plate 20. The brackets 22 may have pivotally mounted or flexible ends for facilitating placement of the plate 20 and for bearing on the upper surface of the plate, or the brackets 22 may be rigid. If rigid, the plate is provided with notches which permit the plate to be placed in position over the brackets and then turned by means of the finger-receiving openings 23 to move the plate into the position shown in FIG. 1 where the brackets 22 bear on the plate 20 at points between the notches. The openings 23 also serve to permit beverage to pass to that part of the bowl beneath the plate 20.

A plurality of sippers 25 are provided, each sipper being curved between its ends and passed through an aperture 19 in the collar 17 of the bowl and an aperture 21 in the plate 20, with the lower end of the sipper in the bowl beneath the plate 20 and the upper end extending outwardly beyond the collar 17.

The bowl body 16 extends downwardly into the opening 12 in the base 10 and due to its conical form is self-adjusting to a position in which the flange 18 bears on the surface 11 of the base. I have shown apertures 27 in the flange 18 for reception of tie cords 26 for tying the bowl to the base, but connecting means are not essential due to the interfitting of the bowl and base and the distributiton of weight resulting from the location of the beverage containing portion of the bowl below the upper surface 11 of the base.

The bowl shown in FIGS. 1–3 may be made of metal or other suitable material.

In that embodiment of the invention shown in FIG. 4, the base 30 and bowl 31 are integrally formed of plastic or other suitable material, with the beverage holding portion of the bowl sufficiently below the upper surface of the base to provide stability. Preferably the bowl 31 also has an upright collar 32 provided with holes 33 through which sippers 25 extend outwardly as heretofore described. Instead of using a plate such as the plate 20 referred to hereinabove, the bowl 30 may be provided with loops 34 formed or attached on the interior side surfaces through which the lower portions of the sippers extend and are removably retained.

FIGS. 5 and 6 show a bowl 40 which may be integral with the base 41 or may be a separate unit supported in a base similar to the base 10. The beverage holding portion of the bowl 40 is divided into separate compartments by radially extending partitions 42 for containing different beverages. The compartments of course can also hold containers such as cans and bottles from which beverages may be drawn by the sippers 25 which may be of different colors to identify users. The bowl 40 also has a collar 43 with holes 44 for receiving the upper portion of sippers 25, and retaining members 45 for engaging the lower portions of the sippers and holding them in predetermined positions.

In FIG. 7, a bowl 46 is provided with a centrally located ring or projection 47 against which individual beverage containers such as cans or bottles 48 may bear to retain them in upright positions adjacent the bowl side wall. The bowl 46 also has a collar 49 with holes 50 for receiving the upper portions of sippers 25.

The provision of partitions 42 for dividing the bowl into compartments for receiving different beverages, and the provision of means 47 to provide bearing surfaces for the lower ends of containers, may be applied to bowls integral with their bases or to bowls separate from their bases.

I claim:

1. A floatable beverage bowl comprising
   (a) a floatable base having depth defined by spaced apart upper and lower surfaces and a central recess or opening,
   (b) a bowl having a beverage holding body and an upwardly extending collar, said collar having a plurality of apertures extending therethrough,
   (c) a plurality of beverage sippers having lower ends in the bowl and extending through said apertures in the collar for holding the sippers in predetermined spaced apart positions, whereby a number of persons may simultaneously sip the beverage in the bowl while in a swimming pool or other body of water.

2. The floatable beverage bowl defined by claim 1, which includes a plate anchored in the bowl above the bowl bottom, said plate having apertures therein for receiving and holding sippers in predetermined spaced apart positions.

3. The floatable beverage bowl defined by claim 1, which includes a plate anchored in the bowl above the bowl bottom, said plate having apertures equal in number to the apertures in the collar for receiving and holding sippers in predetermined spaced apart positions.

4. The floatable beverage bowl defined by claim 3, in which the plate is removably anchored in the bowl by brackets attached to the bowl for bearing on the plate.

5. The floatable beverage bowl defined by claim 4, in which the plate is notched adjacent its edge for placement over the brackets in the bowl.

6. The floatable beverage bowl defined by claim 1, in which the bowl is provided with loops on its interior side walls through which the lower portions of the sippers extend and are retained in predetermined positions.

7. A floating beverage bowl comprising
   (a) a floatable base having depth defined by spaced apart upper and lower surfaces and a central recess or opening,
   (b) a bowl formed integrally with the base and having a beverage containing body located in the recess or opening with the major part of the beverage containing body below the upper surface of the base, said bowl being provided with loops on its interior side walls, and
   (c) a plurality of sippers having their lower ends extending through the loops for retaining the sippers in predetermined positions.

References Cited

UNITED STATES PATENTS

| | | | |
|---|---|---|---|
| 3,015,406 | 1/1962 | Nolte | 220—1 |
| 3,367,525 | 2/1968 | Elder | 220—1 |

GEORGE T. HALL, Primary Examiner

U.S. Cl. X.R.

150—1.5; 220—90.6